United States Patent [19]

Alderfer

[11] 3,712,362
[45] Jan. 23, 1973

[54] A PNEUMATIC TIRE WITHOUT BEAD REINFORCEMENT RINGS

[76] Inventor: Sterling W. Alderfer, 464 N. Portage Path, Akron, Ohio 44303

[22] Filed: Oct. 1, 1970

[21] Appl. No.: 77,133

[52] U.S. Cl. ................................. 152/361, 152/354
[51] Int. Cl. ............................................. B60c 9/20
[58] Field of Search ....... 152/354, 356, 361, 330, 352

[56] References Cited

UNITED STATES PATENTS

| 924,267 | 6/1909 | Palmer | 152/354 |
|---|---|---|---|
| 1,415,281 | 5/1922 | Wale | 152/354 |
| 2,906,314 | 9/1959 | Trevaskis | 152/356 |
| 3,083,749 | 4/1963 | Destinay et al. | 152/361 |
| 3,345,228 | 10/1967 | Kovac et al. | 156/126 |
| 3,578,057 | 5/1971 | Knipp | 152/356 |

Primary Examiner—Drayton E. Hoffman
Assistant Examiner—Robert Saifer
Attorney—Hamilton, Renner & Kenner

[57] ABSTRACT

A molded tire and method for producing such a tire. The tire has a generally conventional horseshoe shaped cross section including a tread supporting wall bounded by shoulders from each of which a side wall extends radially inwardly to terminate in a bead foot that requires no reinforcement to impart the hoop strength necessary to retain the tire on a rim. The required hoop strength is imparted by a substantially inextensible belt that is encased within or around the tread supporting wall portion. Inasmuch as the beads need not be reinforced in the customary sense they may each well present a heel for engagement by the opposed hook flanges on a clincher type rim. A tire embodying the foregoing construction may be molded by positioning the reinforcing belt within a mold cavity and thereafter introducing the elastomeric material from which the tire is to be cast.

10 Claims, 10 Drawing Figures

PATENTED JAN 23 1973 3,712,362
SHEET 1 OF 3
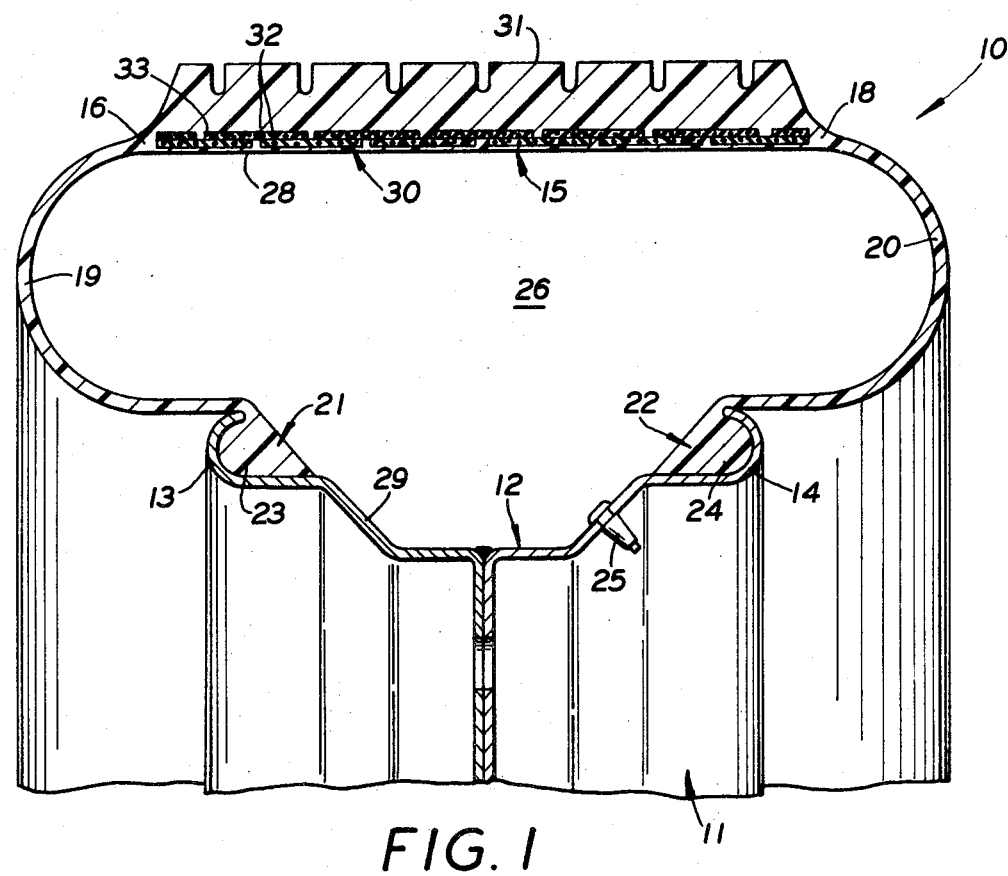
FIG. 1
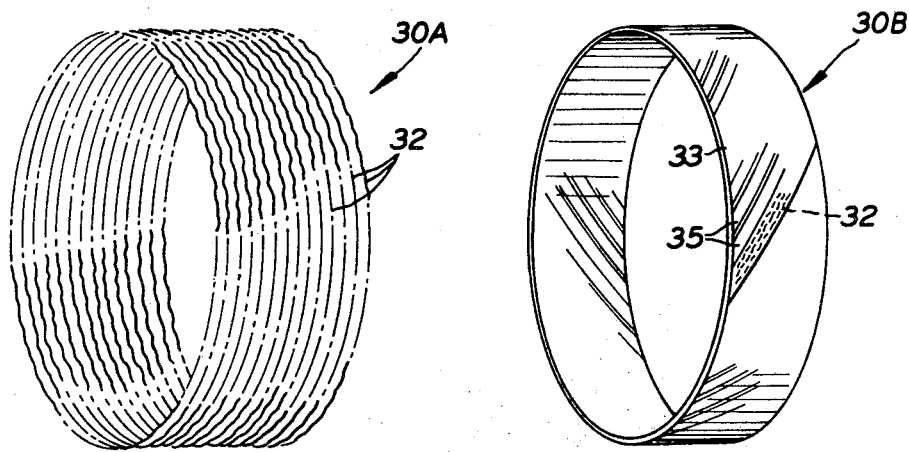
FIG. 2
FIG. 3
INVENTOR.
STERLING W. ALDERFER
BY Hamilton, Cook,
Renner & Renner
ATTORNEYS

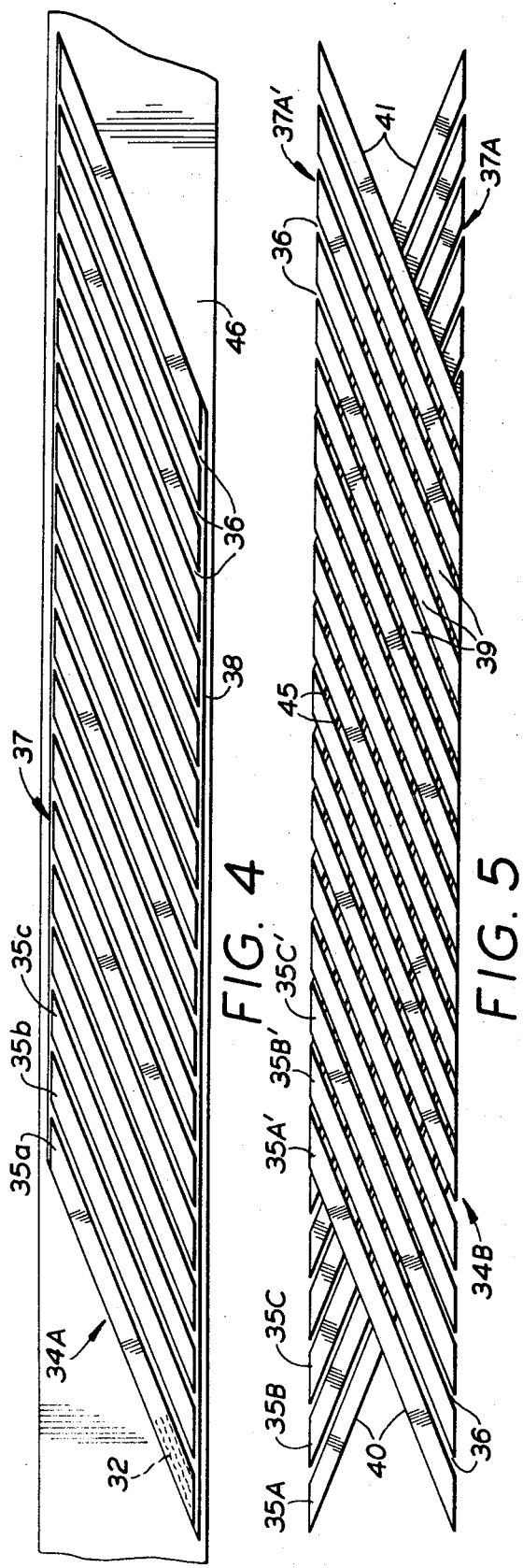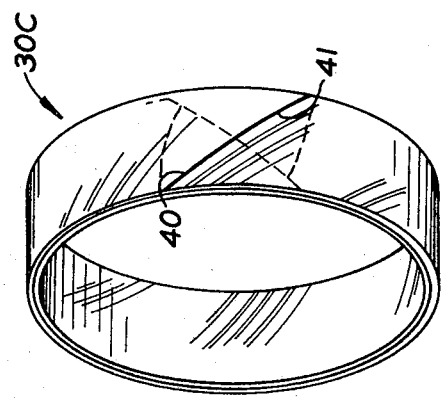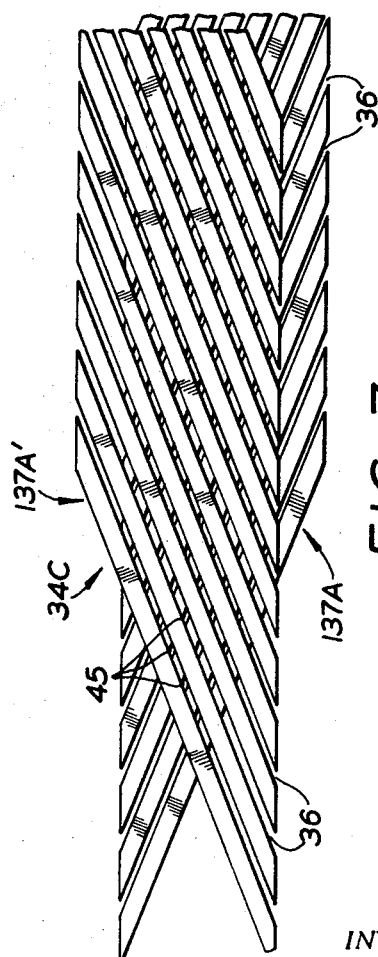

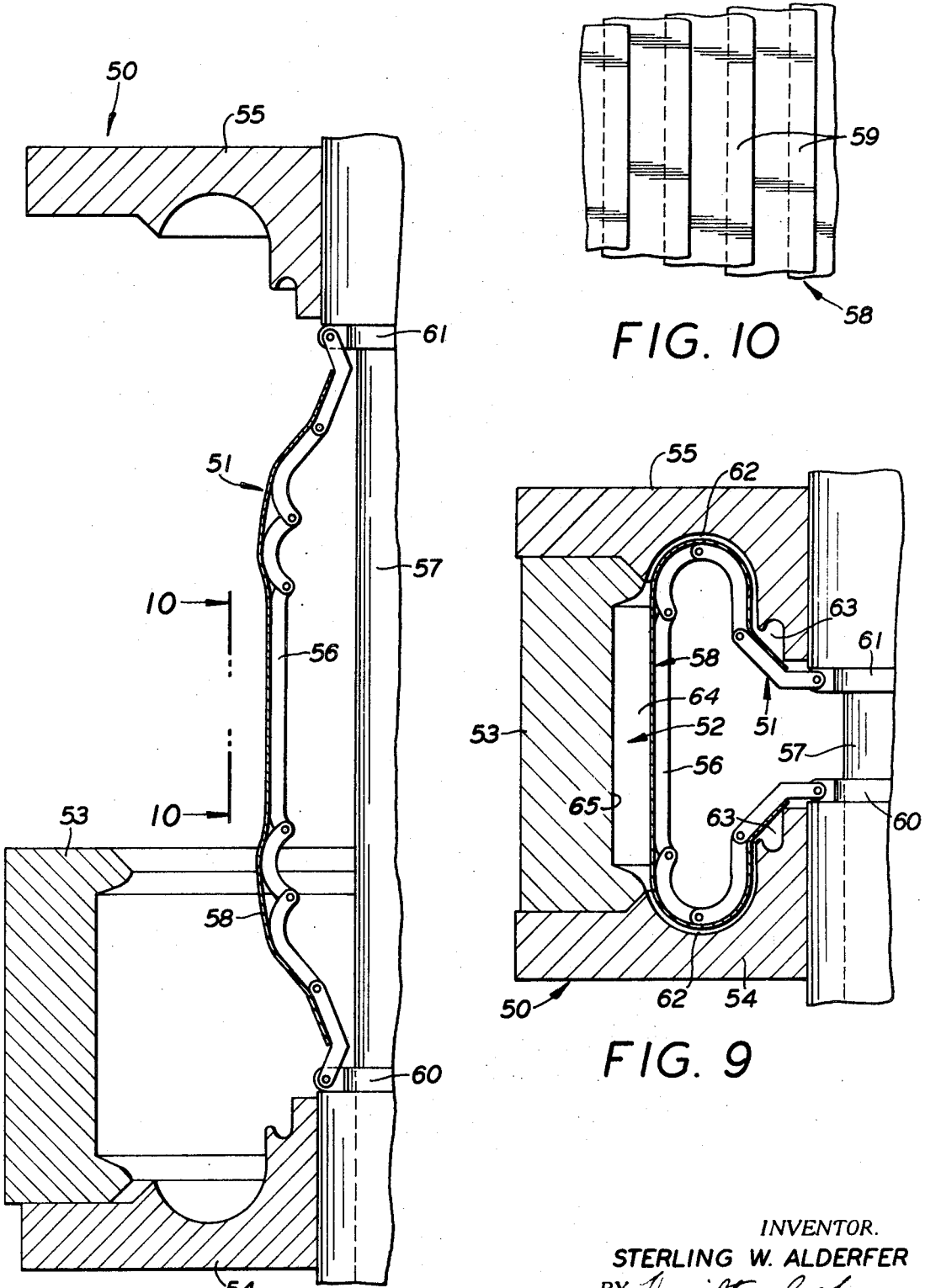

A PNEUMATIC TIRE WITHOUT BEAD REINFORCEMENT RINGS

BACKGROUND OF THE INVENTION

The present invention relates generally to tire construction and manufacture. More particularly, the present invention relates to molded pneumatic tires.

Pneumatic tires are complex structures developed in the face of countless problems. Many of these problems arise from combining several highly dissimilar materials into an integrally functioning article. The typical pneumatic tire is epitomized by its generally horseshoe shaped cross section. The majority of the tire consists of a textile fabric — either of natural or synthetic fibers — intermixed with a vulcanized rubber or an equivalent compound. Additional wear resistant rubber, or substitutes therefore, form the tread portion which contacts the road, and the radially innermost, or bead, portion of the tire — that corresponding to the heels of the horseshoe — contains a stranded wire ring, or grommet, for maintaining that portion of the assemblage inextensible. Although such reinforcing was not historically employed, as the weight and speed of vehicles supported by pneumatic tires increased, bead reinforcing became the order of the day until, prior to the present invention, it had become the sine qua non by which vehicular, pneumatic tires are retained on their rims.

Such tires are laboriously made by wrapping plies of the rubber coated textile fabric onto a tire building drum; the bead grommet being suitably positioned and enclosed by the plies. At this stage the future tire looks like an endless belt and is called a tire band. After removal from the drum-like tire building machine, the tire band must be shaped into its familiar toroidal form and cured. Not only does this entire process require highly paid, skilled labor, expensive machinery and considerable time, but it is also subject to numerous dangerous and expensive errors. For example, misplacement of the bead grommet onto the tire building machine results in a tire band which is out-of-round. Tires formed from such bands have bunched fabric on one side and overly stretched fabric on the other, each such distortion of the fabric being capable of causing premature tire failure.

Less obvious but equally as deleterious, simply mishandling the tire band after it is formed and before it is shaped can cause actual tire failure during service. Permitting the tire band to lie flat, to hang on too slender a support, to be folded, or to be subjected to the weight of an external object constitutes mishandling. Even improperly putting the tire band into the shaping and curing press or improperly removing it can cause irreparable damage. Any of these things can cause the bead grommet to kink, and once the bead grommet is kinked there is no feasible way of straightening it. The danger occurs when a kinked bead grommet is cured into a tire. And, after the tire has successfully survived the various pitfalls of the necessary manufacturing operations, it is still subject to the hazard of careless mounting onto the rim with which it will be used. Any attempt forcibly to pry or drive the bead over the rim flanges may cause the bead wire to kink or separate from the rubber and fabric with which it is surrounded.

Kinking of the bead can result in localizing the stresses to which the bead is subjected and even itself result in separation of the grommet from the fabric. Localization of the stresses eventually crystallizes the wire so that failure may result at that point. Separation may cause failure of the bead by permitting corrosion, but even more dangerous, a bead grommet that has separated from the surrounding fabric will generate sufficient heat to char and completely destroy the fabric.

Tire manufacturers are fully aware of these difficulties and are continually searching for methods and materials to eliminate any, or all, of these drawbacks. One prior known attempt to avoid many of these difficulties involved molding the tire into its toroidal shape. But even then the utilization of the bead reinforcing has become so engrained as being a required structural element necessary to the retention of the pneumatic tire on a rim that considerable technology developed with respect to the apparatus and methods by which the bead reinforcing could be located with predetermined precision in a molded tire.

SUMMARY OF THE INVENTION

It is, therefore, a primary object of the present invention to provide a construction for pneumatic tires that does not require bead reinforcement to maintain it on a rim.

It is another object of the present invention to provide a pneumatic tire construction, as above, in which a substantially inextensible belt is incorporated in proximity to the tread portion thereof in order to provide sufficient hoop strength to the tire that the use of bead reinforcing is obviated.

It is a further object of the present invention to provide a pneumatic tire construction, as above, in which an inextensible reinforcing belt is incorporated within the tire in proximity to the tread portion thereof — a suitable bond between the belt and the material forming the remainder of the tire being assured.

It is an even further object of the present invention to provide a pneumatic tire, as above, that can be readily molded.

It is a still further object of the present invention to provide a method for molding a tire embodying the foregoing advantages.

These and other objects, together with the advantages thereof over existing and prior art forms which will become apparent from the following specification, are accomplished by means hereinafter described and claimed.

In general, a tire embodying the concept of the present invention is adapted to be molded and requires no reinforcing in the bead areas. Sufficient hoop strength for retaining it on a rim is imparted by a substantially inextensible reinforcing belt encased within the tire radially outwardly of the bead feet.

The carcass of such a tire has an annular tread supporting wall portion bounded by lateral shoulders from which the side walls extend radially inwardly and terminate in bead feet. The annular reinforcing belt extends within, or around, the tread supporting wall portion.

The bead feet are preferably provided with heel portions so that they can be engaged by the opposed flange hooks on clincher type rims, but they may well be straight sidewalls. In either event, no reinforcing is required within the bead feet to maintain the tire on the rim.

The reinforcing belt is subject to wide variation in its configuration but preferably incorporates helically wound reinforcing filaments in the nature of wire.

To mold such a tire one must provide a mold and core that co-operate to define a cavity therebetween. The cavity presents at least a tread supporting wall forming portion, sidewall forming portions and bead forming portions. A substantially inextensible reinforcing belt is inserted into that portion of the cavity including the tread supporting wall forming portion, the mold is closed and an elastomeric material, such as urethane or rubber, is introduced into the cavity. After the elastomeric material has been retained within the cavity a sufficient time to permit it to be handled — and even after the application of heat, as necessary or desired — the mold is opened and the tire removed.

One prefered embodiment of the subject tire, together with a plurality of alternative variations by which the reinforcing belt can be fabricated and a schematic representation of apparatus with which such a tire can be molded according to the process hereof are shown by way of example without attempting to show all of the various forms and modifications in which the invention might be embodied; the invention being measured by the appended claims and not by the details of the specification.

DESCRIPTION OF THE DRAWINGS

FIG. 1 is a transverse section through a tire embodying the concept of the present invention, the tire being shown mounted on a rim;

FIG. 2 is a perspective view, in reduced scale with respect to FIG. 1, of one form of an annular reinforcing band adapted to be incorporated within a tire embodying the concept of the present invention and in proximity to the tread portion thereof;

FIG. 3 is a perspective view, similar to FIG. 1, of an alternative form of an annular reinforcing band in which the reinforcing material is encapsulated within an elastomeric body;

FIG. 4 is a plan view of a ply strip that can be hooped into an annular reinforcing band for incorporation within a tire according to the present invention, the ply strip comprising one layer of laterally spaced, elemental strips that are maintained in their spaced relation by a sheet-like tie means, all of which is carried on an additional supporting sheet, a plurality of reinforcing filaments being embedded within each elemental strip;

FIG. 5 is a view similar to FIG. 4 depicting a further form of ply strip in which two layers of elemental strips are superimposed;

FIG. 6 is a perspective view similar to FIGS. 2 and 3 depicting a still further form of an annular reinforcing belt;

FIG. 7 is a view similar to FIGS. 4 and 5 depicting a still further form of ply strip in which the two layers are positioned in laterally overlapping relation;

FIG. 8 is a schematic representation of an exemplary molding apparatus for making a tire according to the concept of the article and method disclosed herein, the molding apparatus being depicted with the mold sections in the open position and the core collapsed whereby the tire molded therein can be removed;

FIG. 9 is a view similar to FIG. 8 with the mold sections closed and the core expanded to define the cavity in which a tire of the type depicted in FIG. 1 is molded; and, FIG. 10 is a partial elevation of the skin strips employed on the core, taken substantially on line 10—10 of FIG. 8.

DESCRIPTION OF THE PREFERRED EMBODIMENTS

Referring more particularly to FIG. 1 of the drawings, a pneumatic tire embodying the concept of the present invention is designated generally by the numeral 10 and is depicted as being mounted on a rim 11. The rim 11 may employ the well known drop center portion 12 to facilitate mounting and demounting of the tire 10, but irrespective of the construction incorporated in the center portion of the rim, in the preferred form the lateral flanges, rather than extend radially outwardly and axially away from each other as do most all current rims, curve radially outwardly and toward each other in order to present axial hooks 13 and 14 that opposingly face each other across the center portion 12 in the same fashion as the historic clincher rim.

The tire 10 has a tread supporting wall portion 15 with lateral shoulders 16 and 18 that merge into the respective side walls 19 and 20. The side walls 19 and 20 terminate in bead feet 21 and 22, respectively, located radially inwardly of the tread supporting wall portion 15. In the preferred form a heel 23 on bead foot 21 is anchored under the hook presented by lateral flange 13, and a similar heel 24 on bead foot 22 is anchored under the hook presented by lateral flange 14. The foregoing structural arrangement constitutes the physical contact between the tire 10 and rim 11 and is the same as was utilized by the historic clincher system but which had long ago been replaced by the reinforced bead, even with all its inherent drawbacks.

The interaction of the heels 23 and 24 on the bead feet 21 and 22 with the hooks 13 and 14, respectively, is particularly well suited for tubeless tires inasmuch as inflation of the tire as well as the centrifugal forces in the tire induced by rotation of the wheel both combine to augment the sealing contact between the bead feet and their respective rim flanges. As such, a valve 25 may be mounted to communicate with the cavity 26 bounded by the inner surfaces 28 and 29 of the respective tire 10 and rim 11 through the center portion 12 of the rim 11.

It must also be noted that whereas the preferred form of the subject tire employs a bead adapted for a clincher rim, the concept of the present invention may also be embodied in tires having the straight-side bead so that existing rims can be utilized.

Heretofore, it had not been appreciated that the hoop strength necessary to maintain a tire on its rim, even when used in conjunction with the present day, heavy, high speed vehicles, can well be imparted by a substantially inextensible, reinforcing belt, or breaker ply, 30 incorporated in, or around, the tread supporting wall portion 15. When the tread portion 31 of the tire 10 is, as shown, concentrically integral with the tread supporting wall portion 15 the reinforcing belt 30, irrespective of its exact radial placement, is considered to be within the wall portion 15. However, many prior art concepts teach the use of a tread portion that is distinct from the remainder of the carcass either because there is a difference in the material from which the two portions are made or because the tread portion is physically separable from the carcass. In those situations the reinforcing belt may be located either within the wall portion or within the tread portion but so long as the reinforcing belt 30 lies in or around the supporting wall portion 15 the necessity for the inclusion of reinforcement within the beads is obviated.

Although the actual reinforcing element of the belts 30 may be selected from a wide range of materials presently known to, and used by, the tire industry, the wire reinforcing disclosed as a preferred embodiment in my copending U. S. Pat. application, Ser. No. 858, filed on Jan. 6, 1970, works quite well and is, in fact, particularly suited for such use.

According to one form of the present invention a reinforcing belt 30 sufficient to provide the necessary hoop strength to maintain a tire 10 on a rim 11 may comprise an annulus 30A (FIG. 2) of one or more reinforcing filaments 32 that can be molded directly into the material forming the tire. As shown, the reinforcing filaments 32 comprise one or more strands of wire wound in a double helix. Each individual strand is wound as a first helix having a diameter no more than three times the diameter of the strand itself and the helical strand, or strands, are arranged as a second helix of sufficient diameter to be positioned in or around the tread supporting wall portion 15 of the tire 10.

The filaments 32 may, alternatively, be first encapsulated within an elastomeric body 33. That is, the double helical arrangement of the reinforcing filaments 32, as in belt 30A, may itself be encased in an annular body of elastomeric material, or, as represented in FIG. 3, the reinforcing filaments 32 can be encased in elemental strips 35 having an elastomeric body 33. According to the latter concept a succession of such elemental strips 35 are not only laterally juxtaposed to form the reinforcing belt 30B but are also oriented such that the reinforcing filaments therein are disposed at a predetermined bias, as disclosed in my aforesaid application, Ser. No. 858. Such an independently fabricated belt would then be molded within the tire 10, as is hereinafter more fully described. In addition, however, it has been found that belts providing most satisfactory results can be achieved by hooping the alternative ply strip constructions depicted in FIGS. 4, 5 and 7.

The ply strip 34A depicted in FIG. 4 may well also be made on apparatus of the type disclosed in FIG. 13 of the aforesaid application, Ser. No. 858, although rather than index the apparatus to deposit the successive elemental strips in contiguous juxtaposition to form a ply strip as disclosed in my said prior application, the apparatus may be indexed to deposit the successive elemental strips 35a, 35b, 35c etc. at spaced intervals with a gap 36 between each successive elemental strip 35. As is also fully disclosed in the aforesaid application, one or more reinforcing filaments 32, each delineating a cylindrical helix having a diameter no more than three times the diameter of the filament forming the helix, are embedded in each elemental strip.

When so separated, the elemental strips require some tie means by which to maintain their spaced relation in the resulting ply strip 34A, and this can be accomplished by supporting the successive strips as a layer 37 on a sheet 38 of material compatible with the elastomeric body 33.

As a further alternative one may superimpose a second series of elemental strips 35A', 35B', 35C', etc. in the form of a layer 37A' diagonally across a first series of elemental strips 35A, 35B, 35C, etc., in the form of a layer 37A to produce the composite ply strip 34B shown in FIG. 5. The diagonal orientation of the superimposed layers places the elemental strips in either layer in contact with a plurality of elemental strips in the other layer. By stitching the elemental strips of each layer to the elemental strips of the other layer with which they make contact, as at contact points 39, a suitable tie is achieved to bind the elemental strips so that the resulting composite ply strip 34B can be formed into the continuous belt 30C by bringing the forked ends 40 and 41 into interfitted juxtaposition (FIG. 6).

As shown in FIG. 5, the two layers 37A and 37A' of elemental strips are in exact register; however, it may well be desirable to position the layers in laterally overlapping relation, as when it is desired to have the belt extend at least partially into the shoulder areas 16 and 18 that define the merger between the tread supporting wall portion 15 and the side walls 19 and 20 of the tire carcass. As shown in FIG. 7, the layer 137A' may be oriented laterally with respect to layer 137A to comprise an alternative form of composite ply strip 34C.

In either event, interstices 45 are formed where the gaps 36 in each of the layers 37A (or 137A) and 37A' (or 137A') cross. As is hereinafter more fully described, the interstices 45 afford the opportunity to assure as great as possible a mechanical bond between the reinforcing belt and the material in the supporting wall portion 15 of the tire carcass and/or the tread portion.

It should be appreciated that when the elastomeric material used for the body 33 of the elemental strips 35, and even the supporting sheet 38 in ply strip 34A, is of such a nature that it will tend to adhere to items with which it is brought in contact, it is preferable to support the resulting ply strip 34 on a film 46 (FIG. 4) such as polyethylene. In that way the ply strips 34 may be readily transported. In fact, successive lengths of such ply strips supported on a single length of film 46 may even be wound into a roll.

Depending upon the material from which the tire 10 is to be made, the belt 30 may or may not be precured. If the belt is to be used within a tire the carcass of which is to be made of the same elastomeric material as the body of the belt, they may well be cured simultaneously. For example, if both were to be made of rubber, they could be simultaneously cured after the tire is made. However, if the tire carcass is to be made of an elastomeric material for which the cure differs from that required for the body of the belt 30, it may be advantageous to precure the belt before it is enclosed within a tire 10. This latter condition is exemplified by the use of a belt having a rubber body 33 within a urethane tire.

A tire 10 embodying the concept of the present invention is well adapted to be molded. To mold such a tire, a mold 50 and core 51 must cooperate to define a toroidal cavity 52 therebetween in the form of the finished tire 10.

In order to facilitate removal of the molded tire the mold 50 may be a multiple piece mold, as shown in FIGS. 8–10. That is, a plurality of segments 53 are movable radially into annular juxtaposition peripherally of the cavity 52 to form the tread design. The segments 53, when annularly juxtaposed, also engage the axially opposed sections 54 and 55 of the mold 50 to complete the outer surface of the toroidal cavity 52.

Removal of the molded tire is further facilitated by use of the collapsible core 51. An exemplary form of a collapsible core, as schematically represented in FIGS. 8–10, has a plurality of circumferentially spaced, multiple-link, shaping means 56 that underlie a plurality of interleafing skin strips 58. Further with regard to removal of the tire, the lower mold 54, for example, may be secured to the upstanding center post 57, but at least the upper mold 55 must be slidable therealong and removable therefrom in order to permit the molded tire to be lifted off the lower mold 54, upwardly along and over both the core 51 and the top of the center post 57.

When the shaping means 56 are axially extended, as when the mold 50 is opened (FIG. 8), the skin strips 58 assume a generally cylindrical disposition. However, when the mold is closed (FIG. 9) the shaping means 56 assume a radially expanded condition to dispose the skin strips 58 in a generally toroidal form. In their toroidal form the skin strips comprise the surface that forms the inner wall of the tire. As shown in FIG. 10, the skin strips 58 each have a center portion 59 that is of sufficient width to overlap — i.e., interleaf — a portion of the adjacent skin strip. This accommodates the increase in the circumferential dimension of the core occasioned by the radial expansion thereof from its cylindrical to its toroidal shape. As shown in FIG. 9, the opposite ends of the shaping means 56 are pivotally attached to opposed collar means 60 and 61, at least one of which is slidably mounted on the centerpost 57. By securing the lowermost collar 60 to the lower mold section 54 and releasably securing the upper collar 61 to the upper mold section 55, the opening and closing of the mold results in a corresponding contraction and expansion of the core 51. The releasable connection between collar 61 and mold section 55 permits the separation of the upper mold section 55 necessary to remove the molded tire.

Referring more particularly to FIG. 9, it can be seen that the cavity 52 presents a tread supporting wall forming portion 64 (radially inwardly of the tread forming surfaces 65 on the radially movable segments 53), side wall forming portions 62 and a foot forming portion 63 at the radially inner extremity of each side wall forming portion 62. It should also be appreciated that in the event one wishes to add the tread portion of the tire as a separate step, the forming surfaces 65 on the movable segments 53 may be positioned in closer proximity to the skin strips 58 in order to define the radially outer face of the tread supporting wall.

In order to mold a tire according to the concept of the present process, a suitable reinforcing belt is first made according to the manner hereinbefore described, the substantially inextensible belt 30 is positioned within or around the tread supporting wall forming portion 64 of the cavity 52, and the elastomeric material from which the tire, or a portion thereof, is to be made is introduced into the cavity.

With rubber a relatively high pressure injection molding technique would be employed. However, with elastomeric urethane the introduction of the material is somewhat simplified.

Urethane elastomer is produced through the reaction of certain polyisocyanates and polyhydroxy compounds to form a long chain, essentially linear macromolecules which are conventionally chain extended and cross linked to complete the reaction. Such conventional urethane elastomers are generally prepared by casting techniques in which polyesters and/or polyethers, polyisocyanates and chain extenders are mixed together in liquid state at elevated, or room, temperatures and poured into molds. After a period of solidification the molds may be opened and the solid elastomer removed. Complete curing of the "green" elastomer may be accomplished by leaving it in the mold for a period of time beyond that required to solidify, or the green elastomer may be removed and cured by circulating hot air around it.

Plasticizers may be added to increase the flexibility and reduce hardness. Similarly, pigments may be added, as desired, for color control.

Urethane elastomers offer high tensile strength and have outstanding abrasion, cut and tear resistance; excellent solvent resistance, particularly to gasoline; low air permeability; exceptionally low temperature flexibility; and, resistance to aliphatic hydrocarbons.

After the elastomeric material has set, or cured, the mold and core are separated and the molded tire is removed. It should be appreciated that with the inextensible belt 30 encapsulated within the tire 10, and particularly with those embodiments of the belt in which a mechanical bond results between the belt 30 and the urethane from which the remainder of the tire has been molded, the inherent tendency of urethane to grow has been effectively precluded, at least in a radial direction and largely in any axial direction. However, should it be desired to obviate any axial expansion of the side wall, that portion of the tire may be relatively easily reinforced by a knit cloth, as is fully disclosed in my prior U. S. Pat. No. 3,379,236.

It should also be appreciated that for the best quality tires the urethane should not include air pockets or other bubbles. The components from which elastomers are produced can be commercially purchased in a state of alleged degasification. However, it has been found that such components do not possess the requisite freedom from entrained gases to produce bubble free elastomers. Moreover, most standard metering, mixing and dispensing equipment available is not capable of satisfactorily degasifying the components, or, for that matter, is not capable of maintaining the components degasified to the degree they were when purchased. However, a system for satisfactorily degasifying the components through the metering, mixing and dispensing stages, and maintaining them so degasified, so as to produce a bubble free tire of urethane elastomer is disclosed in my prior U. S. Pat. NO. 3,390,813.

In addition to the affect on the strength of the tire, one of the chief reasons for making the urethane as bubble free as possible is to preclude its permeability to air — factor of particular importance to tubeless tires. It has been found, however, that the permeability of the tire to air can be eliminated by slipping a sleeve of stretchable, air impervious film over the core 51 when it is in its generally cylindrical disposition depicted in FIG. 8. As the core 51 is expanded to its toroidal shape the film will stretch thereover and will then adhere to the elastomer admitted into the cavity 52 and will remain as the air impervious inner surface 28 (FIG. 1) of the tire 10.

The sleeve of film also comprises a barrier to prevent access of the urethane to the core 51 and thereby acts as a substitute for a release agent to assure that the core remains clean for successively cast tires.

Those relatively new rubber compounds which possess sufficient stability for tire side walls without additional reinforcement are particularly well suited for a tire of the type herein disclosed. But even for those compounds it can be seen that the use of belts with interstices 45 greatly enhance the bond between the belt and the rest of the tire carcass.

In view of the foregoing disclosure it should be apparent to one skilled in the art that a tire embodying the concept of the present invention does not require bead reinforcement and is particularly adapted to being molded.

What is claimed is:

1. A pneumatic tire comprising; an annular tread supporting wall portion having lateral shoulders, a tread portion extending concentrically of said wall portion, a side wall joined to each said shoulder and terminating in a rim engaging bead foot located radially inwardly of said bead supporting wall portion, reinforcing means to provide the sole hoop strength necessary to maintain said bead feet in engagement with a rim, said reinforcing means being an annular belt means encased within said tire radially outwardly of said bead feet, said reinforcing means having one or more reinforcing filaments, each said filament delineating a cylindrical helix, the diameter of said helix being no greater than three times the diameter of said filament, said filaments being encased in a succession of elemental strips, said elemental strips being oriented within said annular belt such that the reinforcing filaments are disposed at a predetermined bias.

2. A pneumatic tire, as set forth in claim 1, in which said succession of elemental strips are laterally juxtaposed.

3. A pneumatic tire, as set forth in claim 1, in which said succession of elemental strips are laterally spaced as a first layer and retained in their laterally spaced disposition by tying means.

4. A pneumatic tire, as set forth in claim 3, in which said tying means comprises a sheet of compatible elastomeric material.

5. A pneumatic tire, as set forth in claim 3, in which said tying means comprises a second layer of laterally spaced elemental strips diagonally superimposed upon said first layer.

6. A pneumatic tire, as set forth in claim 5, in which the lateral spacing of the elemental strips in said layers form interstices through said belt.

7. A pneumatic tire, as set forth in claim 6, in which superimposed layers are registered.

8. A pneumatic tire, as set forth in claim 6, in which said superimposed layers overlap in laterally offset relation.

9. A pneumatic tire, as set forth in claim 8, in which said reinforcing filaments are wires.

10. A pneumatic tire comprising; an annular tread supporting wall portion having lateral shoulders, a tread portion extending concentrically of said wall portion, a side wall joined to each said shoulder and terminating in a rim engaging bead foot located radially inwardly of said bead supporting wall portion, reinforcing means to provide the sole hoop strength necessary to maintain said bead feet in engagement with a rim, said reinforcing means being an annular belt means encased within said tire radially outwardly of said bead feet, said reinforcing means having one or more reinforcing filaments, each said filament delineating a cylindrical helix, the diameter of said helix being up to approximately three times the diameter of the filament forming said helix, the diameter of said helix and the lay thereof being dimensioned with respect to the diameter of the wire filament so as to provide no more than seven per cent elongation of the helix within the elastic limit of the wire.

* * * * *